US010729298B2

(12) United States Patent
Cho

(10) Patent No.: US 10,729,298 B2
(45) Date of Patent: Aug. 4, 2020

(54) CYCLONE DUST COLLECTOR AND VACUUM CLEANING DEVICE

(71) Applicant: Samsung Electronics Co., Ltd., Suwon-si, Gyeonggi-do (KR)

(72) Inventor: Dong Jin Cho, Hwaseong-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 128 days.

(21) Appl. No.: 15/966,301

(22) Filed: Apr. 30, 2018

(65) Prior Publication Data
US 2018/0242803 A1 Aug. 30, 2018

Related U.S. Application Data

(62) Division of application No. 14/924,272, filed on Oct. 27, 2015, now Pat. No. 9,980,619.

(30) Foreign Application Priority Data

Mar. 27, 2015 (KR) .................. 10-2015-0043290

(51) Int. Cl.
*B01D 50/00* (2006.01)
*A47L 9/16* (2006.01)
(Continued)

(52) U.S. Cl.
CPC ............ *A47L 9/1675* (2013.01); *A47L 5/362* (2013.01); *A47L 9/165* (2013.01); *A47L 9/1608* (2013.01);
(Continued)

(58) Field of Classification Search
CPC ........ A47L 9/1675; A47L 5/362; A47L 9/165; A47L 9/1683; A47L 9/1608;
(Continued)

(56) References Cited

U.S. PATENT DOCUMENTS 4,639,191 A 1/1987 Hart
6,521,006 B2* 2/2003 Park .................. A47L 5/362
15/352
(Continued)

FOREIGN PATENT DOCUMENTS

DE 413923 5/1925
DE 4415005 11/1995
(Continued)

OTHER PUBLICATIONS

Extended European Search Report dated May 30, 2018 in European Patent Application No. 18155561.6.
(Continued)

Primary Examiner — Dung H Bui
(74) Attorney, Agent, or Firm — Staas & Halsey LLP

(57) ABSTRACT

In a cyclone dust collector and a vacuum cleaning device having the same, foreign substances can be prevented from being attached on an outer circumferential surface of a grill located at an outlet part, so that an inhalation force of the vacuum cleaning device can be prevented from being lowered. Also, foreign substances collected in the cyclone dust collector can be easily removed. The vacuum cleaning device includes: a cyclone dust collector, wherein the cyclone dust collector includes: a cyclone chamber in which air introduced through an inlet part is whirled and dust is separated from the air; an outlet part disposed so that the air from which the dust is separated is discharged from the cyclone chamber; and a grill that is rotatably disposed in the outlet part.

20 Claims, 14 Drawing Sheets

(51) Int. Cl.
*A47L 5/36* (2006.01)
*B04C 9/00* (2006.01)
*B01D 46/00* (2006.01)

(52) U.S. Cl.
CPC .............. *A47L 9/1683* (2013.01); *B04C 9/00* (2013.01); *A47L 9/1625* (2013.01); *A47L 9/1641* (2013.01); *B01D 46/0068* (2013.01); *B04C 2009/002* (2013.01); *B04C 2009/007* (2013.01)

(58) Field of Classification Search
CPC ....... A47L 9/1641; A47L 9/1625; B04C 9/00; B04C 2009/007; B04C 2009/002; B01D 46/0068
See application file for complete search history.

(56) References Cited

U.S. PATENT DOCUMENTS

| | | | |
|---|---|---|---|
| 6,625,845 B2 | 9/2003 | Matsumoto | |
| 6,635,712 B1 | 10/2003 | Aoyama | |
| 6,758,874 B1 | 7/2004 | Hunter, Jr. | |
| 6,811,584 B2 | 11/2004 | Oh | |
| 6,916,351 B2 * | 7/2005 | Oh | A47L 9/1675 55/304 |
| 6,928,692 B2 * | 8/2005 | Oh | A47L 9/1666 15/352 |
| 7,070,636 B2 | 7/2006 | McCormick | |
| 7,074,248 B2 | 7/2006 | Jin | |
| 7,152,276 B2 | 12/2006 | Jin | |
| 7,152,277 B2 | 12/2006 | Jung | |
| 7,351,269 B2 | 4/2008 | Yau | |
| 7,419,520 B2 * | 9/2008 | Lee | A47L 9/20 15/347 |
| 7,704,290 B2 | 4/2010 | Oh | |
| 7,780,752 B2 | 8/2010 | Cha | |
| 7,785,381 B2 | 8/2010 | Oh | |
| 2001/0049928 A1 | 12/2001 | Park | |
| 2003/0159235 A1 | 8/2003 | Oh | |
| 2003/0159236 A1 | 8/2003 | Oh | |
| 2003/0208879 A1 | 11/2003 | Oh | |
| 2003/0221278 A1 | 12/2003 | Oh | |
| 2004/0098827 A1 * | 5/2004 | Oh | A47L 9/1675 15/347 |
| 2004/0163206 A1 | 8/2004 | Oh | |
| 2006/0042202 A1 | 3/2006 | Lee | |
| 2006/0196154 A1 * | 9/2006 | Benedictus | A47L 9/1608 55/337 |
| 2007/0220842 A1 * | 9/2007 | Oh | A47L 9/1666 55/337 |
| 2008/0047239 A1 * | 2/2008 | Zheng | B01D 45/14 55/337 |
| 2010/0083459 A1 * | 4/2010 | Beskow | A47L 5/225 15/353 |
| 2010/0251506 A1 * | 10/2010 | Conrad | A47L 9/1683 15/344 |
| 2011/0289723 A1 * | 12/2011 | Adelman | A47L 11/24 15/347 |
| 2012/0102901 A1 | 5/2012 | de Wit | |
| 2012/0192378 A1 * | 8/2012 | Bassett | A47L 9/108 15/353 |
| 2017/0202418 A1 * | 7/2017 | Cheo | A47L 9/1683 |

FOREIGN PATENT DOCUMENTS

| | | | | |
|---|---|---|---|---|
| EP | 2 255 710 A1 | 12/2010 | | |
| GB | 2 358 347 A | 7/2001 | | |
| GB | 2 389 064 A | 12/2003 | | |
| JP | 2004275720 A | * 10/2004 | ............... | A47L 9/20 |
| JP | 2013027552 A | * 2/2013 | ............. | A47L 9/108 |
| KR | 2001-0049141 | 6/2001 | | |
| KR | 10-2005-0100913 | 10/2005 | | |
| KR | 10-2014-0113308 | 9/2014 | | |
| WO | WO 2011/010253 A1 | 1/2011 | | |

OTHER PUBLICATIONS

Extended European Search Report dated Aug. 19, 2016 in corresponding European Patent Application No. 15195808.9.
European Communication dated Oct. 19, 2017 in European Patent Application No. 15195808.9.
U.S. Notice of Allowance dated Feb. 12, 2018 in U.S. Appl. No. 14/924,272.
U.S. Office Action dated Dec. 14, 2017 in U.S. Appl. No. 14/924,272.
U.S. Office Action dated Aug. 21, 2017 in U.S. Appl. No. 14/924,272.
U.S. Office Action dated May 26, 2017 in U.S. Appl. No. 14/924,272.
U.S. Appl. No. 14/924,272, filed Oct. 25, 2015, Dong Jin Cho, Samsung Electronics Co., Ltd.

* cited by examiner

CYCLONE DUST COLLECTOR AND VACUUM CLEANING DEVICE

CROSS-REFERENCE TO RELATED APPLICATIONS

This application is a divisional application of U.S. patent application Ser. No. 14/924,272 filed on Oct. 27, 2015 which claims the benefit of Korean Patent Application No. 10-2015-0043290, filed on Mar. 27, 2015 in the Korean Intellectual Property Office, the disclosures of which are incorporated herein by reference.

BACKGROUND

1. Field

Embodiments of the present invention relate to a cyclone dust collector having improved usability and a vacuum cleaning device having the same.

2. Description of the Related Art

Vacuum cleaning devices are devices that inhale (or intake) air by an inhalation (or intake) force generated by a fan and a motor, and filter foreign substances included in the inhaled air, thereby performing a cleaning operation.

Vacuum cleaning devices include a dust collecting unit disposed therein in which foreign substances are filtered using a predetermined filtering device to filter foreign substances from inhaled air. A filtering mechanism in which the foreign substances are filtered in the dust collecting unit includes a porous filter unit in which the foreign substances are forcibly filtered while air passes through a porous filter, and a cyclone type dust collecting unit in which foreign substances are filtered during a cyclone flow of air.

Cyclone dust collecting devices can be widely used in a canister type cleaning device, an up-right type cleaning device, and a handy type cleaning device.

Cyclone dust collecting devices may include an inlet part through which air is introduced and an outlet part through which air is discharged to the outside of the cyclone dust collecting device. The air introduced through the inlet part may be discharged to the outside through the outlet part after foreign substances included in the air are filtered from the air.

A grill part may be disposed in the outlet part. Air through holes may be formed in the grill part so that dust having more than a predetermined size cannot escape from the outlet part. Large dust or hair may be collected on an outer circumferential surface of the grill part due to whirling (or circulating) air of the cyclone dust collecting device. When the air through holes are clogged by dust attached to the outer circumferential surface of the grill part, an inhalation force of a vacuum cleaning device may be lowered. Also, there are inconveniences in that a user should directly remove the dust attached to the outer circumferential surface of the grill part using his/her hand.

SUMMARY

Therefore, it is an aspect of the present invention to provide a cyclone dust collector that is capable of preventing an inhalation force from being lowered, and a vacuum cleaning device having the same.

It is another aspect of the present invention to provide a cyclone dust collector that is capable of easily removing foreign substances in the cyclone dust collector, and a vacuum cleaning device having the same.

Additional aspects of the invention will be set forth in part in the description which follows and, in part, will be obvious from the description, or may be learned by practice of the invention.

In accordance with one aspect of the present invention, there is provided a vacuum cleaning device including a cyclone dust collector, wherein the cyclone dust collector may include: an inlet part to intake air; a cyclone chamber, coupled to the inlet part, to circulate the air and to separate dust from the air; an outlet part, coupled to the cyclone chamber, to discharge from the cyclone chamber the air from which the dust is separated; and a grill, rotatably disposed in the outlet part, to rotate and to filter the dust from the air.

The cyclone dust collector may further include a fan disposed to be rotatable about a rotation shaft, and the grill is mounted on the fan.

The grill may be rotated by an inhalation force.

The fan may include: a first fan in which the fan is disposed to rotate in one direction by an inhalation force; and a second fan that generates an air current that disturbs an air current caused by the inhalation force.

The second fan may be disposed at an outer circumference of the first fan.

The fan may include: a rotation shaft mounting part on which the rotation shaft is mounted; a fan case spaced a predetermined distance outward from the rotation shaft mounting part; a first fan disposed to connect the rotation shaft mounting part and the fan case; and a second fan disposed at an outside of the fan case.

The cyclone dust collector may further include a grill case in which the fan is rotatably accommodated.

The grill case may be mounted on the outlet part.

The rotation shaft may be disposed at the grill case.

The rotation shaft may be disposed in the grill case and may be supported by a plurality of ribs that extend from an inner side surface of the grill case.

Bearings may be disposed between the rotation shaft and the rotation shaft mounting part so that the fan is rotatable.

When the fan rotates, the second fan may extend so that air is introduced into the cyclone chamber through the outlet part and the air is prevented from being introduced into a space between the fan case and the grill case.

The fan case, the first fan, and the second fan may be integrally injection-molded.

The grill may be inserted and injection-molded when the fan is injection-molded.

A fine filter may be disposed at an upper portion of the outlet part and may filter dust in the air that passes through the grill.

The grill may be disposed on a bottom surface of the fan.

The vacuum cleaning device may further include a grill frame on which the grill is mounted, wherein the grill frame may be disposed to be rotated integrally with the fan.

The grill may be disposed to surround sides of the grill frame.

A side fan that generates an air current that disturbs an air current caused by an inhalation force may be disposed on an outer side surface of the grill frame.

The grill may be disposed in a conical shape.

In accordance with another aspect of the present invention, there is provided a cyclone dust collector including: a cyclone chamber to circulate inhaled air and to separate dust from the air; an outlet part to discharge the air from which the dust is separated in the cyclone chamber to an outside of the cyclone chamber; and a grill, rotatably disposed in the outlet part, to rotate and to filter dust from the air introduced through the outlet part.

The grill may be mounted on a fan that is rotatably disposed due to an inhalation force.

The fan may include: a first fan that extends outward from a center of the fan so that the fan is rotated in one direction by an inhalation force; and a second fan that is disposed at an outside of the first fan and forms an air current in an opposite direction to that of an air current caused by the inhalation force.

The fan may include a fan case, and the first fan may be located inside the fan case, and the second fan may be located outside the fan case.

The cyclone dust collector may further include a grill case mounted on the outlet part, wherein the fan may be rotatably accommodated in the grill case.

When the fan rotates due to an inhalation force, an air current that disturbs an air current caused by an inhalation force may be generated by the second fan and thus air is prevented from being discharged through a gap between an outer side surface of the fan case and an inner side surface of the grill case.

The cyclone dust collector may further include a fine filter through which air discharged through the outlet part passes.

The cyclone dust collector may further include a cover that covers an upper portion of the cyclone chamber and is capable of being opened/closed.

A discharge pipe that is in communication with the outlet part may be disposed in a bottom surface of the cover, and the grill may be mounted in the discharge pipe.

The grill may be mounted in the discharge pipe through a grill case.

A gasket including an elastic material may be disposed between the grill case and the discharge pipe.

The cyclone dust collector may further include a dust collection chamber that is in communication with the cyclone chamber so that dust separated in the cyclone chamber is collected.

In accordance with still another aspect of the present invention, there is provided a cyclone dust collector including: a cyclone chamber to circulate inhaled air and to separate dust from the air; an outlet part to discharge the air from which the dust is separated is to an outside; a fan, included in the outlet part, to rotate; and a grill, connected to the fan, to rotate integrally with the fan.

The fan may be disposed to rotate due to an inhalation force that allows the air to be introduced into the cyclone chamber.

The cyclone dust collector may further include a grill case in which the fan is accommodated, wherein the grill case may be mounted in the outlet part.

A side fan may be disposed on an outer side surface of the fan to generate an air current that disturbs an air current caused by an inhalation force introduced into the cyclone chamber.

The cyclone dust collector may further include a grill frame on which the grill is mounted, wherein the grill frame may be connected to the fan and is rotatable integrally with the fan.

The cyclone dust collector may further include a grill case on which the grill frame is mounted, wherein the grill case may be mounted in the outlet part.

A side fan for generating an air current that disturbs an air current caused by an inhalation force introduced into the cyclone chamber may be disposed on an outer side surface of the grill frame.

A cover that is capable of being opened/closed is further disposed at an upper portion of the cyclone chamber, and wherein a fine filter through which the air discharged through the outlet part passes, may be disposed in the cover.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
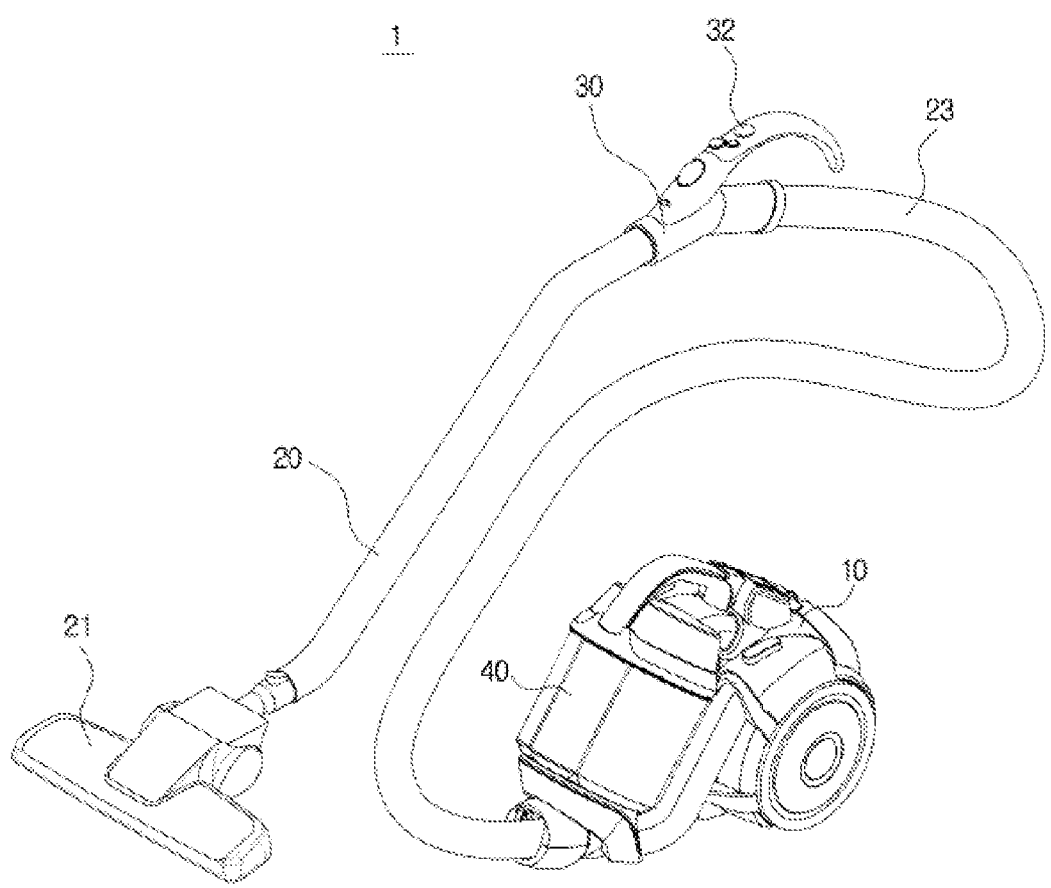
FIG. 1 is a view of a vacuum cleaning device according to an embodiment of the present invention.

Reference will now be made in detail to the embodiments of the present invention, examples of which are illustrated in the accompanying drawings, wherein like reference numerals refer to like elements throughout.

Hereinafter, a cyclone dust collector and a vacuum cleaning device having the same according to an embodiment of the present invention will be described in detail with reference to the drawings.

Figure 2:
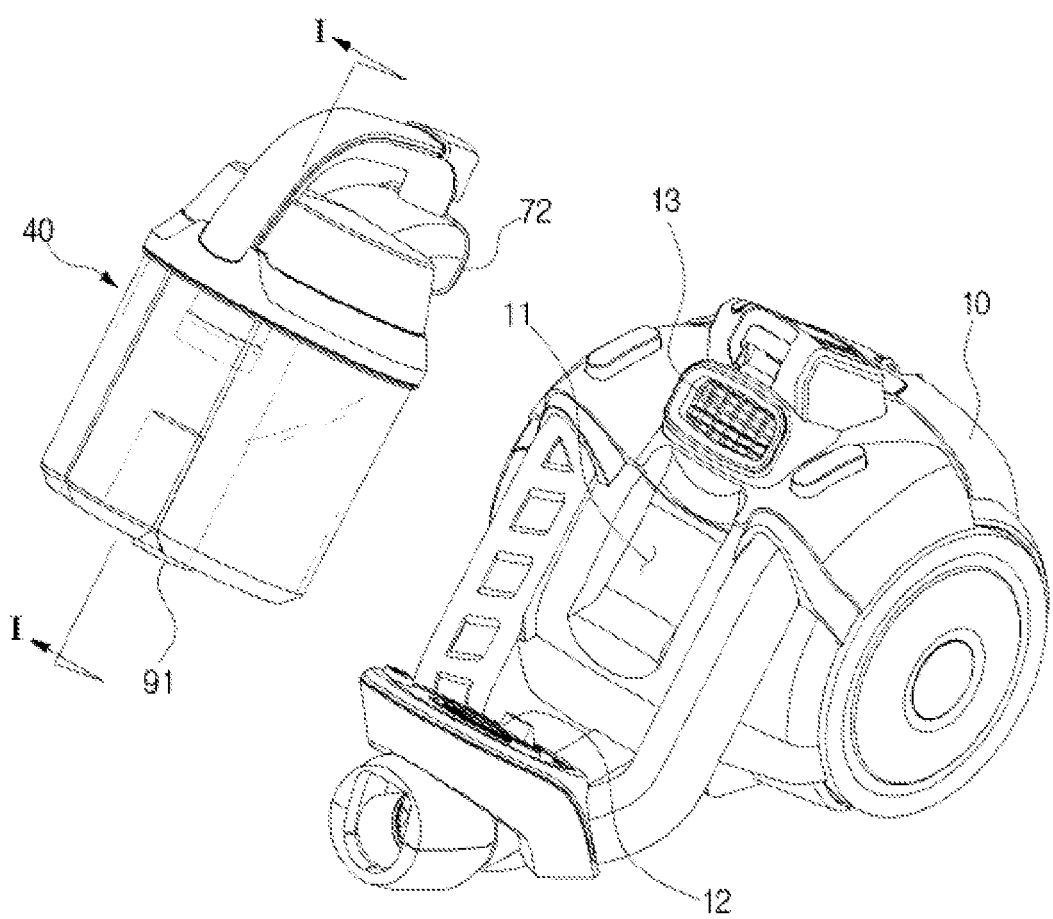
FIG. 2 is a view illustrating a state in which a cyclone dust collector and a main body are separated from each other according to an embodiment of the present invention.

FIG. 1 is a view of a vacuum cleaning device according to an embodiment of the present invention, and FIG. 2 is a view illustrating a state in which a cyclone dust collector and a main body are separated from each other according to an embodiment of the present invention.

Referring to FIGS. 1 and 2, a vacuum cleaning device 1 according to an embodiment of the present invention may be a canister type vacuum cleaning device. The vacuum cleaning device 1 may include a main body 10, a cyclone dust collector 40 mounted on the main body 10, and a suction unit 21 that contacts a surface to be cleaned and inhales air. The cyclone dust collector 40 circulates air by generating a whirling air current and separates dust from the air using a centrifugal force.

The main body 10 includes a fan motor (not shown) that generates an inhalation (or intake) force. The suction unit 21 may inhale (or intake) air on the surface to be cleaned and dust included in the air due to the inhalation force generated in the main body 10. The suction unit 21 may be disposed in a slightly wide and flat shape to be close contact with the surface to be cleaned.

An extension pipe 20 formed of a resin or metal material, a handle pipe 30 for a user's manipulation, and a flexible hose 23 having a flexible material so that the handle pipe 30 may be freely moved may be disposed between the main body 10 and the suction unit 21. A manipulation part 32 that can manipulate a function of the vacuum cleaning device 1 may be disposed in the handle pipe 30.

The suction unit 21, the extension pipe 20, the handle pipe 30, and the flexible hose 23 may be all provided in communication with one another. Thus, the air inhaled through the suction unit 21 may sequentially pass through these elements and flow to the main body 10.

A suction port 12 that guides the inhaled air to the cyclone dust collector 40, and a discharge port 13 through which the air purified in the cyclone dust collector 40 (that is, air having dust removed by the cyclone dust collector 40) is discharged may be disposed in the main body 10. The discharge port 13 may be in communication with a fan motor chamber (not shown) in which a fan motor (not shown) is disposed.

A mounting part 11 which can mount the cyclone dust collector 40 may be disposed in the main body 10, and the cyclone dust collector 40 may be separably mounted on the mounting part 11. The cyclone dust collector 40 may separate dust from the air inhaled through the suction unit 21, collect the dust, and cause the thus purified air to be discharged through the discharge port 13.

The cyclone dust collector 40 has an inlet 91 through which the air including dust is introduced, and an outlet 72 through which the purified air is discharged. When the cyclone dust collector 40 is mounted on the main body 10, the inlet 91 of the cyclone dust collector 40 may be in communication with the suction port 12 of the main body 10, and the outlet 72 of the cyclone dust collector 40 may be in communication with the discharge port 13 of the main body 10.

Figure 3:
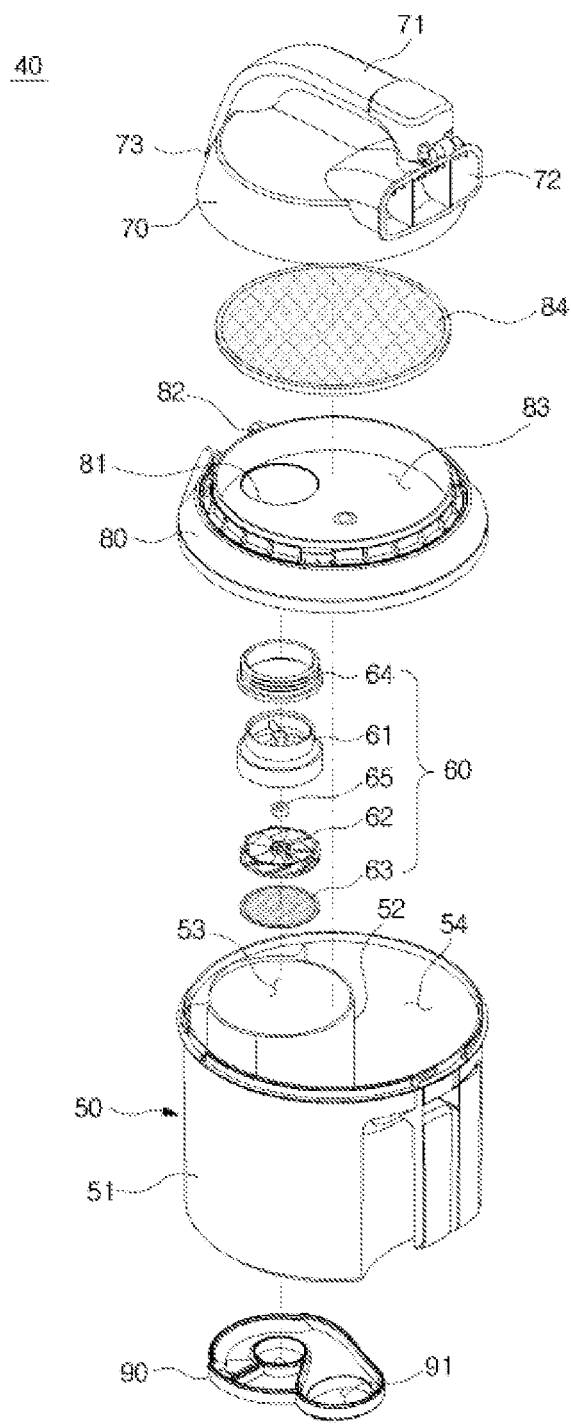
FIG. 3 is an exploded perspective view illustrating a cyclone dust collector according to an embodiment of the present invention.
Figure 4:
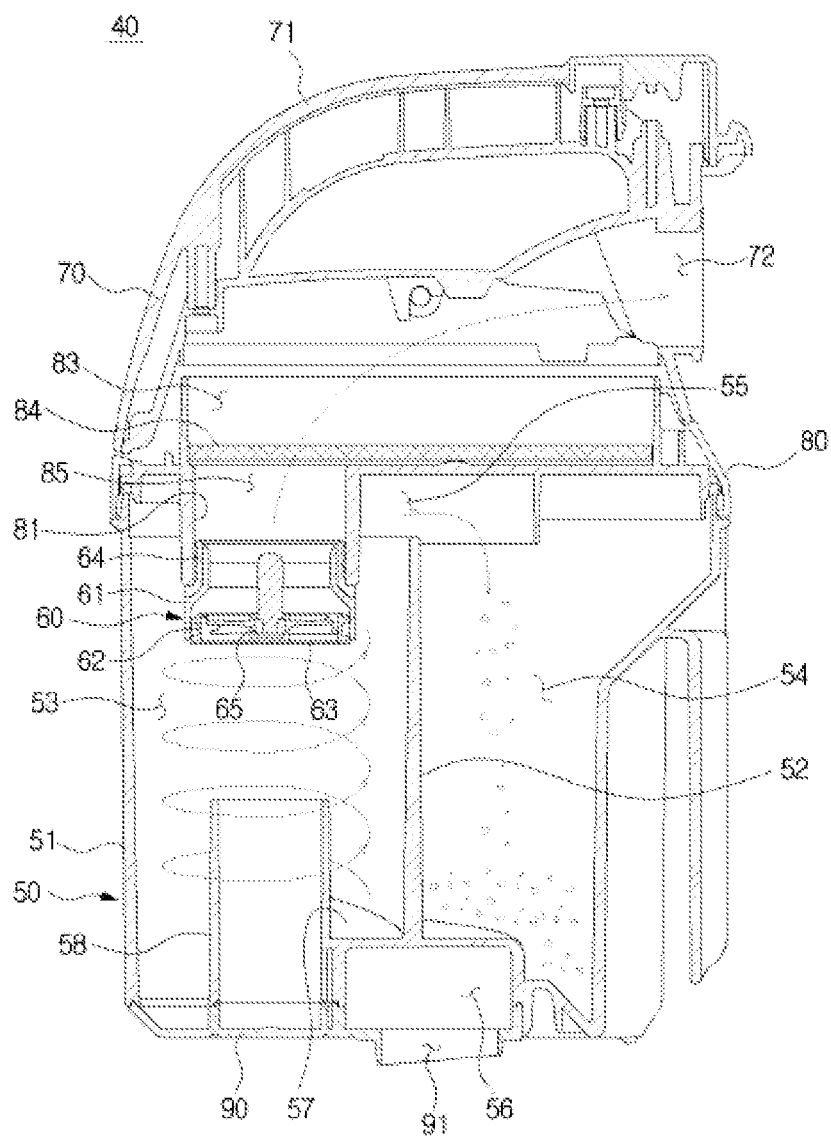
FIG. 4 is a cross-sectional view illustrating a cyclone dust collector according to the embodiment of the present invention.

FIG. 3 is an exploded perspective view illustrating a cyclone dust collector according to an embodiment of the present invention, and FIG. 4 is a cross-sectional view illustrating a cyclone dust collector according to the embodiment of the present invention.

Referring to FIGS. 3 and 4, the cyclone dust collector 40 according to an embodiment of the present invention may include a case 50 having an approximately cylindrical shape, a top surface and a bottom surface of which are opened, an upper cover 70 disposed on an upper portion of the case 50, an intermediate cover 80 disposed between the upper cover 70 and the case 50 to cover the top surface of the case 50, and a lower cover 90 that is coupled to a lower portion of the case 50 and covers the opened bottom surface of the case 50.

The intermediate cover 80 may be separably coupled to the top surface of the case 50 and cover the top surface of the case 50. The upper cover 70 may be disposed on an upper side of the intermediate cover 80 and be hinge-coupled to the intermediate cover 80 to be rotatably disposed. To this end, a hinge shaft 73 may be disposed on one side of the upper cover 70, and a hinge shaft accommodation part 82 that accommodates the hinge shaft 73 may be disposed on one side of the intermediate cover 80.

However, the cyclone dust collector 40 may be integrally formed. Also, a shape of the case 50 may not be a cylindrical shape.

The case 50 may be made of a transparent material so that the amount of foreign substances collected in the case 50 may be checked from the outside. The upper cover 70, the intermediate cover 80, and the lower cover 90 may be made of a transparent material or an opaque material.

A cyclone chamber 53 that separates dust from the air using a centrifugal force by forming a whirling air current, and a dust collection chamber 54 that collects the dust may be disposed in the case 50. The cyclone chamber 53 and the cyclone chamber 53 and the dust collection chamber 54 may be partitioned off by an inner wall 52. The cyclone chamber 53 may be disposed in an internal space of the inner wall 52, and the dust collection chamber 54 may be disposed between the inner wall 52 and an outer wall 51. The outer wall 51 may form an exterior of the case 50.

An opening (55 of FIG. 4) through which the cyclone chamber 53 and the dust collection chamber 54 are in communication with each other may be disposed in a one side upper portion of the inner wall 52 so that the dust separated from the air in the cyclone chamber 53 may flow into the dust collection chamber 54. Since the dust heavier than the air is scattered to the outside due to the centrifugal force, the opening 55 may be formed in the side of an outer circumference of the cyclone chamber 53.

The cyclone chamber 53 has an approximately cylindrical shape to form a whirling air current, and a guide part 58 having an approximately cylindrical shape may be disposed in the middle of the cyclone chamber 53 to guide the whirling air current. A spiral part 57 that is formed to be inclined in a spiral shape may be disposed near the guide part 58. The air whirls (or circulates) around the guide part 58 along the spiral part 57.

An inlet part 56 through which the air is introduced into the cyclone chamber 53, and an outlet part 85 through which the air is discharged from the cyclone chamber 53, may be disposed in the cyclone dust collector 40. The air introduced through a dust collector inlet 91 of the lower cover 90 may enter the cyclone chamber 53 through the inlet part 56. The air from which dust is removed in the cyclone dust collector 40 may be discharged to the outside through the outlet part 85 disposed in the middle of the cyclone chamber 53.

The outlet part 85 may have an approximately cylindrical shape with an internal space. A grill assembly 60 that secondarily filters dust from the purified air from which the dust is primarily removed using the centrifugal force may be disposed at the outlet part 85. For example, the grill assembly 60 may be mounted in a discharge pipe 81 of the intermediate cover 80.

The grill assembly 60 may include a grill 63 and a grill case 61 in which the grill 63 is rotatably mounted. The air from which foreign substances are filtered by the grill 63 may be discharged from the cyclone dust collector 40 through the outlet part 85. A detailed configuration of the grill assembly 60 will be described later.

The intermediate cover 80 includes the discharge pipe 81 that guides the air discharged through the outlet part 85, a fine filter 84 that secondarily filters fine dust from the air discharged through the outlet part 85, and a filter mounting part 83 on which the fine filter 84 may be mounted.

The intermediate cover 80 may be separably mounted on the case 50. A user may detach the intermediate cover 80 from the case 50 and then may discard the dust collected in the dust collection chamber 54.

The fine filter 84 may be a sponge. The fine filter 84 may be separably mounted in the filter mounting part 83. An upper portion of the filter mounting part 83 may be covered by the upper cover 70. The filter mounting part 83 may be disposed to be opened/closed by the upper cover 70. For example, the upper cover 70 may be rotatably mounted on the intermediate cover 80. When cleaning or replacement of the fine filter 84 is required, the user may detach the fine filter 84 from the filter mounting part 83 by opening the upper cover 70.

A handle 71 by which the upper cover 70 may be easily opened may be disposed on the upper cover 70. An outlet 72 through which the air re-purified through the fine filter 84 is discharged to an outside of the cyclone dust collector 40 may be disposed in the upper cover 70.

Hereinafter, an operation of the vacuum cleaning device 1 according to an embodiment of the present invention will be described.

When a fan motor (not shown) of the main body 10 is driven, the air on the surface to be cleaned may be inhaled through the suction unit 21 due to an inhalation force of the fan motor (not shown). The inhaled air may sequentially pass through the extension pipe 20, the handle pipe 30, and the flexible hose 23 and be introduced into the cyclone dust collector 40 mounted in the main body 10.

The air introduced into the cyclone dust collector 40 is guided into the cyclone chamber 53 through the inlet part 56. The air guided into the cyclone chamber 53 whirls about the guide part 58 through the spiral part 57 inside the cyclone chamber 53 and rises.

The heavier dust than the air may be scattered outward in a radial direction due to the centrifugal force and may be introduced into the dust collection chamber 54 through the opening 55 located at the upper portion of the cyclone chamber 53. The dust introduced into the dust collection chamber 54 may be dropped due to gravity and be collected in the dust collection chamber 54.

While the air from which the dust is primarily removed by the centrifugal force in the cyclone chamber 53 may pass through the grill assembly 60, dust having a predetermined size or more may be secondarily filtered. The air that passes through the grill assembly 60 may be guided upwardly through the discharge pipe 81 and the outlet part 85. Fine particles included in the air guided toward the intermediate cover 80 through the outlet part 85 may be tertiarily filtered using the fine filter 84 disposed in the intermediate cover 80.

The finally-purified air may be discharged from the cyclone dust collector 40 through the outlet 72 of the upper cover 70 and be discharged to the outside of the main body 10 through a fan motor chamber (not shown). A filter (not shown) through which dust in the art discharged through the outlet 72 can be filtered may be further disposed in the side of the outlet 72 of the upper cover 70.

Figure 5:
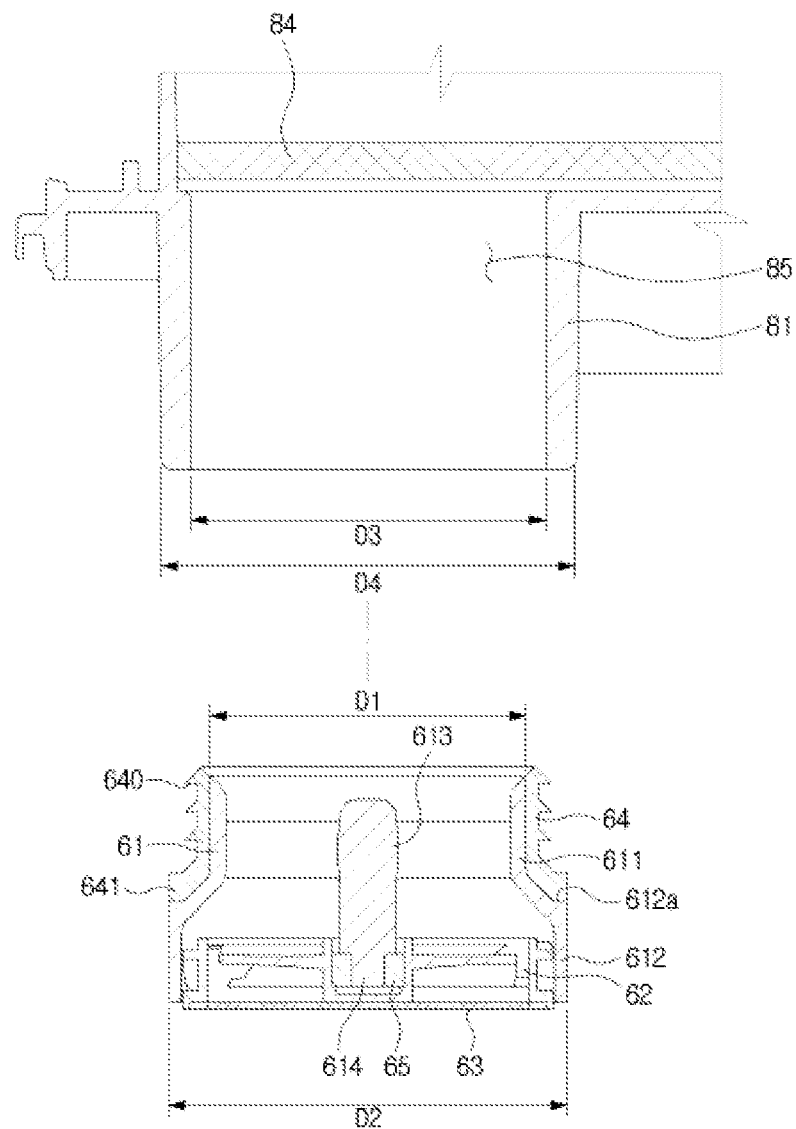
FIG. 5 is a view illustrating an outlet part according to an embodiment of the present invention.
Figure 6:
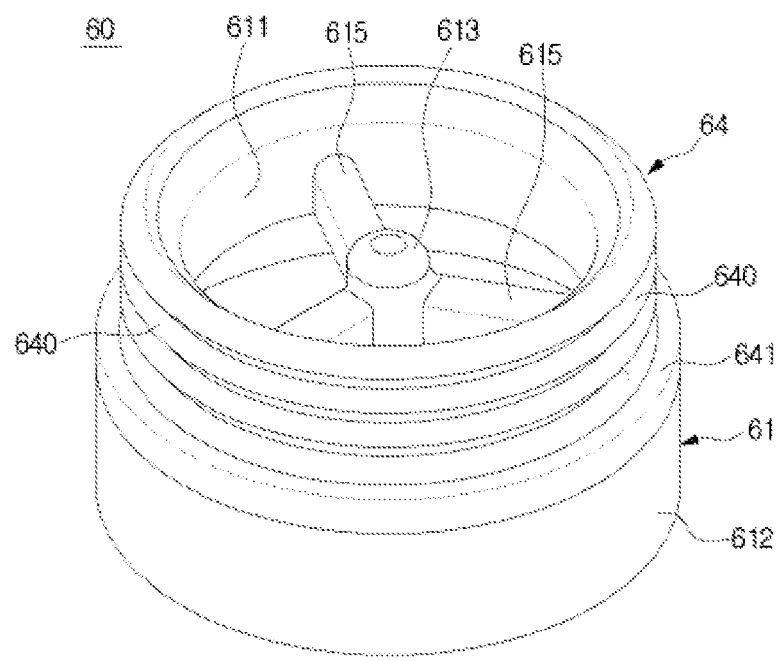
FIGS. 6 and 7 are perspective views illustrating a grill assembly according to an embodiment of the present invention.
Figure 7:
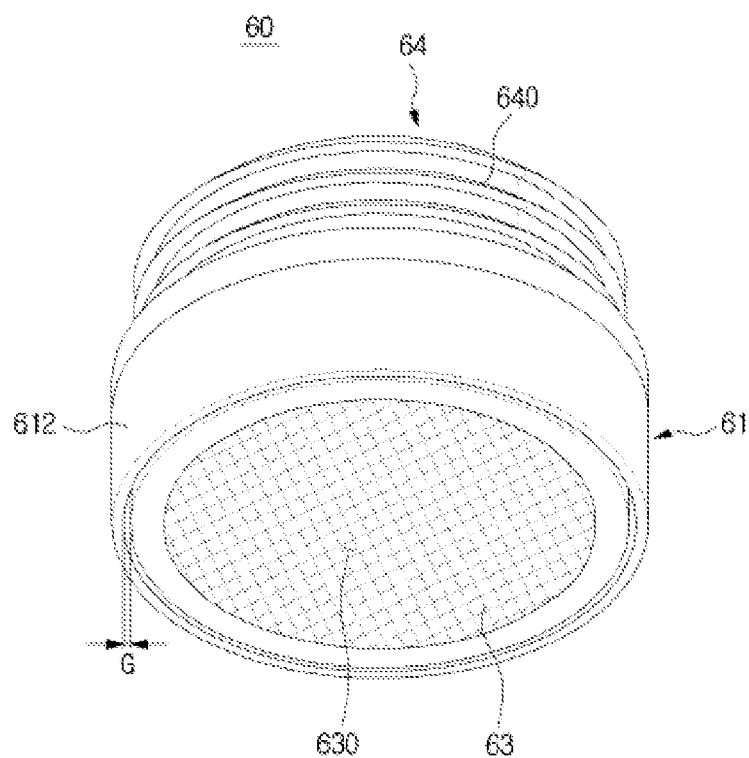
Figure 8:
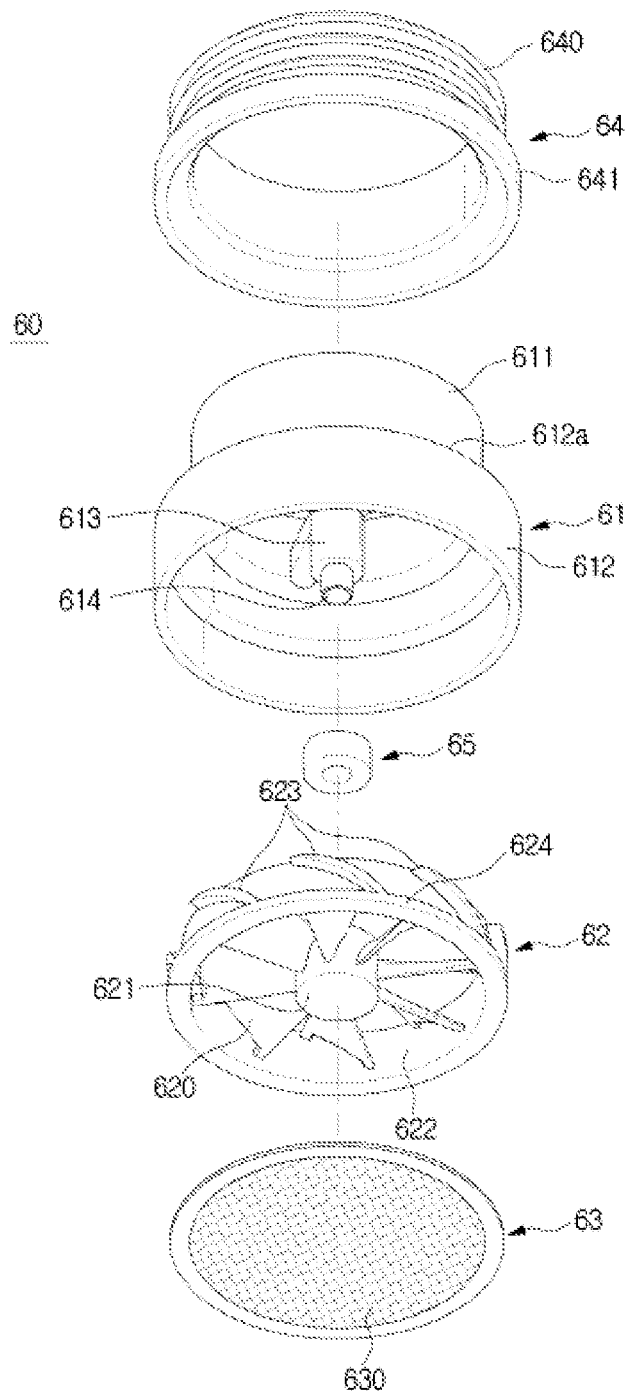
FIG. 8 is an exploded perspective view illustrating a grill assembly according to the embodiment of the present invention.

FIG. 5 is a view illustrating an outlet part according to an embodiment of the present invention, and FIGS. 6 and 7 are perspective views illustrating a grill assembly according to an embodiment of the present invention, and FIG. 8 is an exploded perspective view illustrating a grill assembly according to the embodiment of the present invention.

Referring to FIGS. 5 through 8, the grill assembly 60 may be located at the outlet part 85 according to an embodiment of the present invention. The grill assembly 60 may be disposed in the discharge pipe 81 disposed in a bottom surface of the intermediate cover 80 to filter dust having a predetermined size or more in the air. The air from which the dust is filtered using the grill assembly 60 is guided to an upper side in which the intermediate cover 80 and the upper cover 70 are located, through the discharge pipe 81 and the outlet part 85.

The grill assembly 60 includes a fan 62 that is rotatably disposed using the inhalation force of the fan motor, and a grill 63 mounted in the fan 62. The fan 62 may be rotatably mounted in the grill case 61 around a first axis of rotation. The grill 63 may be mounted in the fan 62 and be rotated around a second axis of rotation together with the fan 62. The first axis of rotation may be coaxial with the second axis of rotation.

The grill case 61 may be mounted in the discharge pipe 81. The grill case 61 may be disposed to correspond to a shape of the discharge pipe 81. When the discharge pipe 81 is disposed in a cylindrical shape, the grill case 61 may be provided in an approximately cylindrical shape. The grill case 61 may be separably mounted in the discharge pipe 81 so that cleaning or replacement of the grill assembly 60 can be performed.

The grill case 61 may be coupled to the discharge pipe 81 using a fastening member, be directly screw-coupled to the discharge pipe 81 using screw threads that are formed on an outer circumferential surface of the grill case 61 and an inner circumferential surface of the discharge pipe 81, respectively, without a separate fastening member, or may be snap-fit coupled to the discharge pipe 81. The grill case 61 may be tight-fitted into the discharge pipe 81. A method of coupling the grill case 61 to the discharge pipe 81 is not limited to the foregoing description.

Hereinafter, the case where the grill case 61 is tight-fitted to the discharge pipe 81 will be described.

One side of the grill case 61 may be coupled to the discharge pipe 81. The fan 62 may be mounted on the other side of the grill case 61. A portion of the grill case 61 coupled to the discharge pipe 81 may be referred to as a first grill case 611, and a portion of the grill case 61 in which the fan 62 is mounted, may be referred to as a second grill case 612. The second grill case 612 may be disposed to be stepped with respect to the first grill case 611. A diameter D2 of the second grill case 612 may be disposed to be larger than a diameter D1 of the first grill case 611.

The first grill case 611 may be inserted into an inside of the discharge pipe 81. Thus, an outer diameter D1 of the first grill case 611 may be formed to be equal to or slightly smaller than an internal diameter D3 of the discharge pipe 81.

A gasket 64 may be disposed between the outer circumferential surface of the first grill case 611 and the inner circumferential surface of the discharge pipe 81. The gasket 64 may be provided in a ring shape and may be inserted into the outer circumferential surface of the first grill case 611. In order to couple the grill case 61 to the discharge pipe 81, the first grill case 611 may be pushed into the discharge pipe 81 in a state in which the gasket 64 is inserted into the outer circumferential surface of the first grill case 611.

The gasket 64 may serve to allow a gap not to be formed between the discharge pipe 81 and the first grill case 611 and fix the first grill case 611 inserted into the discharge pipe 81 not to easily escape from the discharge pipe 81. The gasket 64 may be formed of an elastic material, such as rubber or silicone for example, so that the first grill case 611 is inserted into the discharge pipe 81 and densely (or tightly) coupled thereto.

Ribs 640 that are formed convexly may be disposed on an outer circumferential surface of the gasket 64 so that the first grill case 611 into which the gasket 64 is inserted may be easily inserted into the discharge pipe 81 and the first grill case 611 may be densely (or tightly) coupled to the discharge pipe 81. A plurality of ribs 640 may be disposed along the outer circumferential surface of the gasket 64.

The gasket 64 may further include ribs 641 that may be located between a stepped surface 612a located at an upper portion of the second grill case 612 and an end surface 81a of the discharge pipe 81. The ribs 641 may be located between the stepped surface 612a and the end surface 81a of the discharge pipe 81, thereby preventing a gap from being formed between the stepped surface 612a and the end surface 81a of the discharge pipe 81. Thus, air from which dust is not filtered by the grill 63 may be prevented from being introduced into the discharge pipe 81 through a space between the stepped surface 612a and the end surface 81a of the discharge pipe 81.

The diameter D2 of the second grill case 612 may be disposed to be equal to or slightly smaller than a diameter D4 of an outer circumferential surface of the discharge pipe 81. A fan accommodation part 610 that is a space in which the fan 62 can be accommodated may be disposed in the second grill case 612. A rotation shaft 613 may be disposed in a center of the fan accommodation part 610. The fan 62 may be rotatably mounted on the rotation shaft 613.

The rotation shaft 613 may be supported by a plurality of support ribs 615 that extend from an inner side surface to the center of the second grill case 612. The rotation shaft 613 may be located in the center of the second grill case 612, and the plurality of support ribs 615 may extend toward the center of the second grill case 612 and support the rotation shaft 613.

The fan 62 may be rotatably mounted on the rotation shaft 613. In order to prevent a frictional force between the fan 62 and the rotation shaft 613 from interfering with smooth rotation of the fan, bearings 65 may be disposed between the rotation shaft 613 and the fan 62. A fan mounting part 614 for mounting the fan 62 may be disposed on an end of the rotation shaft 613. A diameter of the fan mounting part 614 may be formed to be smaller than a diameter of the rotation shaft 613 so that the bearings 65 can be mounted in the fan mounting part 614.

The fan 62 may be disposed to rotate about the rotation shaft 613 using an inhalation force generated by the fan motor. A rotation shaft mounting part 621 that may be mounted on the rotation shaft 613 may be disposed in a center of the fan 62. For example, grooves (not shown) into which the rotation shaft 613 may be inserted may be disposed in the rotation shaft mounting part 621. The rotation shaft 613 on which the bearings 65 are mounted is inserted into the groove so that the fan 62 may be mounted in the grill case 61 to rotate about the rotation shaft 613.

The fan 62 may include a fan case 622 centered on the rotation shaft mounting part 621. The fan case 622 may be disposed to have a ring shape centered on the rotation shaft mounting part 621. The fan 62 may include a plurality of first fans 620 that connect the rotation shaft mounting part 621 and the fan case 622. When an inhalation force is generated by the fan motor, the fan 62 may rotate in one direction by the first fan 620. A flow direction of air caused by rotation of the first fan 620 may be provided not to disturb a flow of the air using the inhalation force generated by the fan motor.

A second fan 623 may be disposed on an outer side surface of the fan case 622. The second fan 623 may be provided to disturb the flow of the air caused by the first fan 620. When an inhalation force is generated by the fan motor, the second fan 623 may flow air from the discharge pipe 81 toward the cyclone chamber 53. That is, the second fan 623 may generate an air current in an opposite direction to a direction of an air current generated by the inhalation force of the fan motor. A plurality of second fans 623 may be provided on the outer side surface of the fan case 622 at regular intervals. The second fan 623 is disposed on a side of the fan 62 and thus may be referred to as a side fan.

A grill mounting part 624 on which the grill 63 may be mounted may be disposed on one end of the fan case 622. The grill 63 mounted on the grill mounting part 624 may form a flat surface perpendicular to the fan case 622. The grill 63 mounted on the fan case 622 may be rotated together with the fan 62.

The first fan 620, the second fan 623, the rotation shaft mounting part 621, the fan case 622, and the grill mounting part 624 may be integrally injection-molded. The grill 63 may be inserted when the first fan 620, the second fan 623, the rotation shaft mounting part 621, the fan case 622 and the grill mounting part 624 are injection-molded, and the grill 63, the first fan 620, the second fan 623, the rotation shaft mounting part 621, the fan case 622, and the grill mounting part 624 may be integrally injection-molded. The grill 63 may be attached to the grill mounting part 624 by adhesion after the first fan 620, the second fan 623, the rotation shaft mounting part 621, the fan case 622 and the grill mounting part 624 are injection-molded. A method of mounting the grill 63 on the fan 62 is not limited to the foregoing description.

Figure 9:
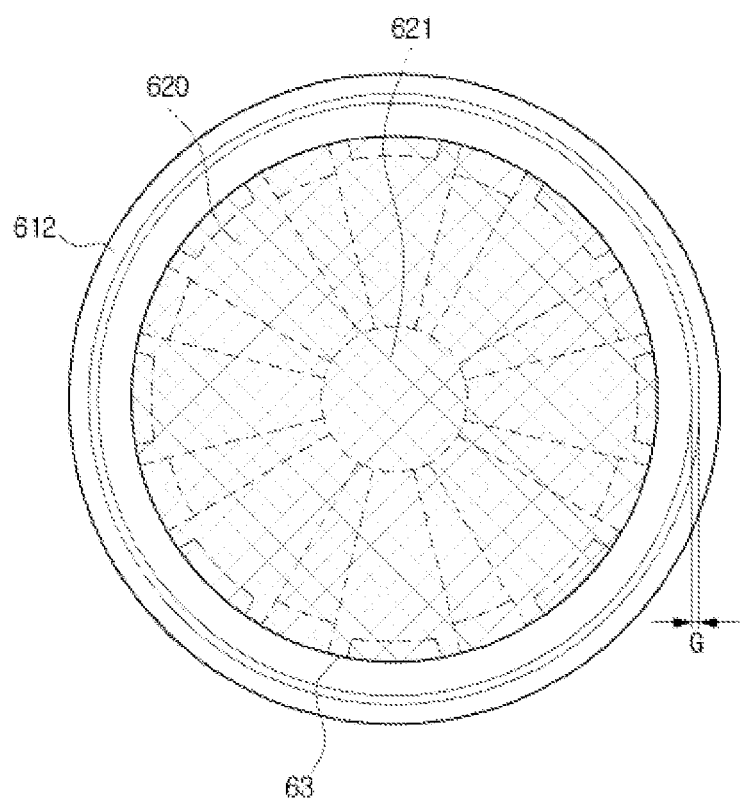
FIG. 9 is a front view illustrating a grill of the grill assembly according to an embodiment of the present invention.

FIG. 9 is a front view illustrating a grill of the grill assembly according to an embodiment of the present invention.

Referring to FIG. 9, the grill 63 according to an embodiment of the present invention may be disposed to be rotated together with the fan 62, and a gap G having a predetermined interval may be formed between the inner side surface of the grill case 61 and the outer circumferential surface of the grill 63 so that the fan 62 may rotate and the grill 63 may be rotated.

When an inhalation force is generated by the fan motor, air that does not pass through the grill 63 may be introduced into the discharge pipe 81 through the gap G between the inner side surface of the grill case 61 and the outer circumferential surface of the grill 63. Air from which dust is not filtered by the grill 63 may be introduced into the discharge pipe 81 through the gap G and may pass through the fine filter 84 disposed in the intermediate cover 80.

In this case, dust in the air that passes through the gap G is not filtered by the grill 63 so that a larger amount of dust may be included in the air that passes through the grill 63. Since a larger amount of dust is filtered by the fine filter 84, a cleaning or replacement period of the fine filter 84 is reduced. When the fine filter 84 is not properly replaced or cleaned, air does not flow smoothly so that the inhalation force generated by the fan motor may be lowered. When the gap G is clogged by dust included in the air or by hair, the grill 63 may not be rotated.

Thus, in order to prevent the air from being discharged through the gap G, the second fan 623 disposed on an outer side surface of the fan case 622 is provided to disturb the flow of air caused by the fan motor. Since the flow of air occurs in a direction from the discharge pipe 81 to the cyclone chamber 53 in the gap G between the grill 63 and an inner side surface of the grill case 61 by the second fan 623, the air may be prevented from being discharged to the discharge pipe 81 through the gap G.

Thus, air that is not filtered by the grill 63 may be prevented from being introduced into the fine filter 84. Also, the gap G may be prevented from being clogged by the dust or hair, and the grill 63 may be prevented from not rotating.

Figure 10:
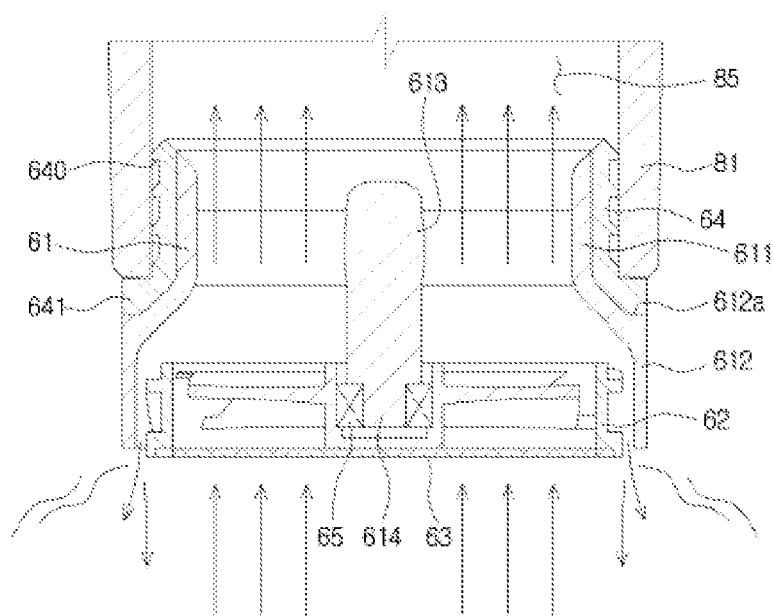
FIG. 10 is a view illustrating an operation of the grill assembly according to the embodiment of the present invention.

FIG. 10 is a view illustrating an operation of the grill assembly according to the embodiment of the present invention.

Referring to FIG. 10, in the grill assembly 60 according to an embodiment of the present invention, the grill 63 may be rotatably provided, and dust on the surface of the grill 63 may be removed by the centrifugal force. When an inhalation force is generated by the fan motor, the fan 62 may rotate and the grill 63 may be rotated integrally. The air from which dust is filtered by a whirling air current of the cyclone chamber 53 may pass through the grill 63 and may flow into the discharge pipe 81.

In this case, since an air current is generated in an opposite direction to a direction of an air current caused by the inhalation force of the fan motor to disturb the flow of air caused by the inhalation force of the fan motor in the gap G between the grill 63 and the grill case 61, the air may not be introduced into the discharge pipe 81 through the gap G. The air in the cyclone chamber 53 may not be discharged toward the discharge pipe 81 through the gap G but may pass through the grill 63 and may be discharged toward the discharge pipe 81.

The dust that does not pass through air through holes 630 formed in the grill 63 may be rotated by the whirling air current of the cyclone chamber 53 and then may be collected in the dust collection chamber 54. In a cyclone dust collector according to the related art, when the air that flows by the inhalation force of the fan motor passes through the grill 63, a part of dust or hair that does not pass through the air through holes 630 of the grill 63 may be attached on the surface of the grill 63. When the air through holes 630 of the grill 63 are clogged by the dust or hair attached on the surface of the grill 63, air does not flow smoothly, and the inhalation force may be lowered so that cleaning efficiency may be lowered.

In the present invention, the grill 63 may be rotatably provided so that dust or hair that reaches the surface of the grill 63 may be removed due to the centrifugal force caused by rotation of the grill 63. The dust removed due to the centrifugal force caused by rotation of the grill 63 may be rotated by the whirling air current of the cyclone chamber 53 and then may be collected in the dust collection chamber 54.

In this way, the grill 63 is rotatably provided so that the inhalation force of the vacuum cleaning device 1 may be prevented from being lowered and cleaning efficiency may be improved. Since dust is not attached on the surface of the grill 63, the user does not need to remove dust attached on the surface of the grill 63 by his/her hand to remove dust in the cyclone dust collector 40. Since the user detaches the cyclone dust collector 40 from the main body 10 and needs to discard the dust collected in the dust collection chamber 54, the cyclone dust collector 40 may be easily cleaned. Also, dust is not introduced through the gap G between the grill 63 and the grill case 61 so that air from which dust is not filtered by the grill 63 may be prevented from being introduced into the fine filter 84. Thus, a replacement or cleaning period of the fine filter 84 may be increased compared to the related art.

Figure 11:
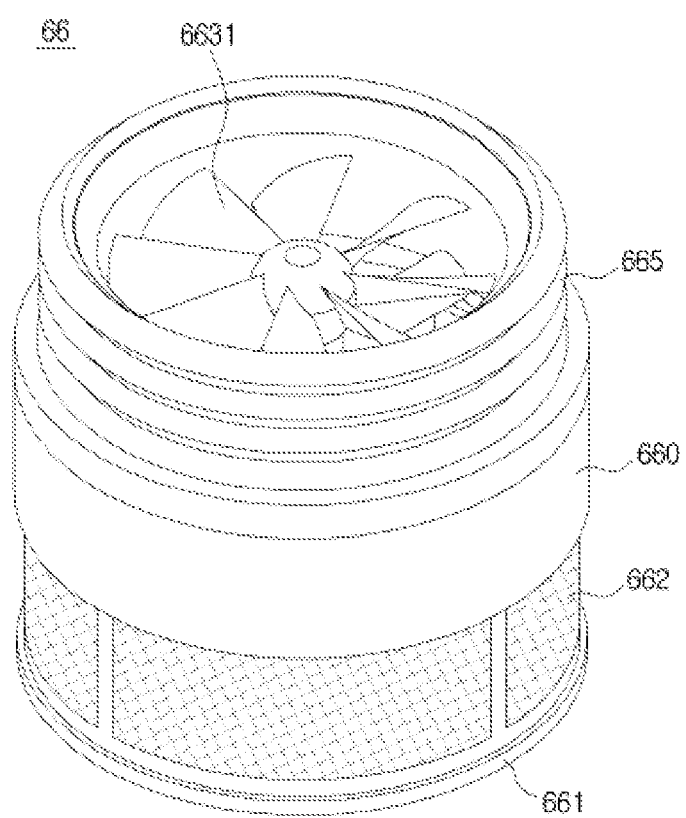
FIG. 11 is a perspective view illustrating a grill assembly according to another embodiment of the present invention.
Figure 12:
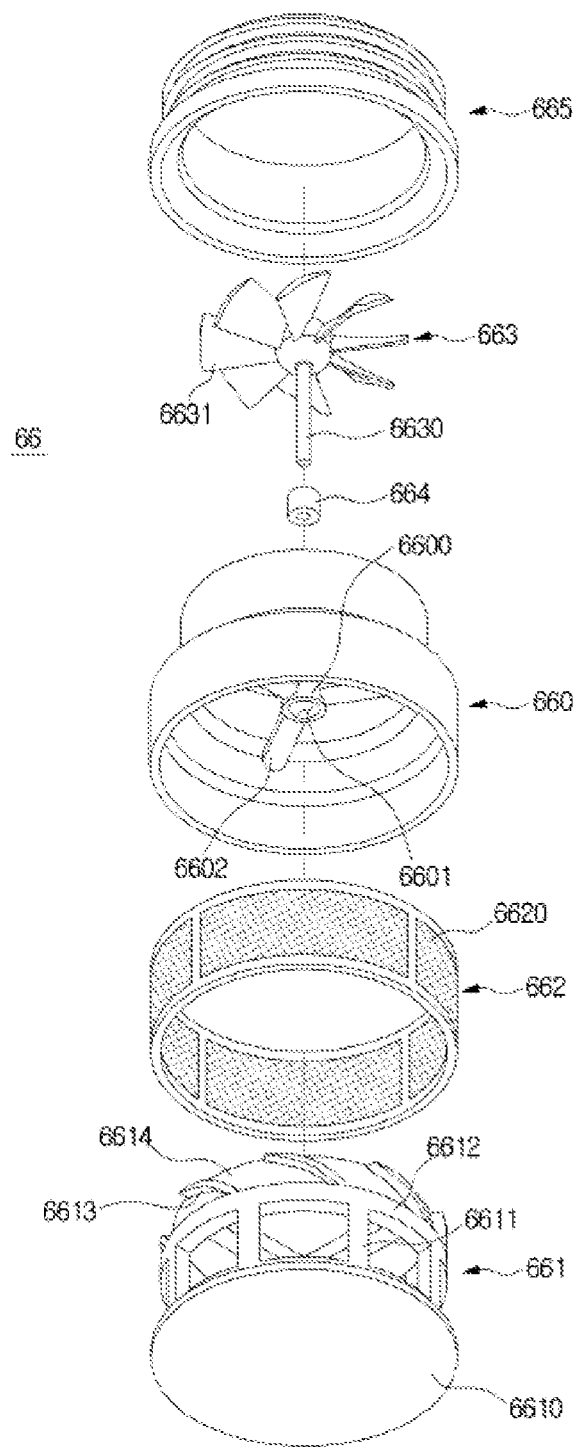
FIG. 12 is an exploded perspective view of the grill assembly according to the other embodiment of the present invention.

FIG. 11 is a perspective view illustrating a grill assembly according to another embodiment of the present invention, and FIG. 12 is an exploded perspective view of the grill assembly according to the other embodiment of the present invention.

Referring to FIGS. 11 and 12, the grill assembly 66 according to another embodiment of the present invention may include a grill frame 661, a grill 662 disposed on a side of the grill frame 661, and a fan 663 that is rotatable by an inhalation force of the fan motor. The fan 663 is mounted in the grill frame 661, and when an inhalation force is generated by the fan motor, the grill frame 661 connected to the fan 663 may be rotated together with the fan 663. The fan 663 includes first fan 6631.

The air that whirls in the cyclone chamber 53 and rises may pass through air through holes 6620 of the grill 662 disposed at the side of the grill frame 661 and may be upward guided through the discharge pipe 81 and the outlet part 85 illustrated in FIG. 4. In FIGS. 11 and 12, an embodiment in which the grill 662 is disposed on the side of the grill frame 661 has been described. However, the grill 662 may be disposed in a bottom surface 6610 of the grill frame 661.

The grill assembly 66 may include a grill case 660 in which the grill frame 661 and a fan 663 are mounted. A rotation shaft mounting part 6600 having rotation shaft insertion holes 6601 formed therein may be disposed in a center of the grill case 660. A rotation shaft 6630 connected to the fan 663 may be inserted into the rotation shaft insertion holes 6601. In order to prevent a frictional force between the rotation shaft 6630 and an inner side surface of the rotation shaft mounting part 6600 from interfering with rotation of the fan 663, bearings 664 may be disposed between the rotation shaft 6630 and the rotation shaft mounting part 6600.

The rotation shaft mounting part 6600 may be supported by a plurality of ribs 6602 that extend from the inner side surface of the grill case 660 toward the center of the grill case 660.

The fan 663 may be disposed to rotate about the rotation shaft 6630 using the inhalation force of the fan motor. The grill frame 661 may be connected to an end of the rotation shaft 6630 connected to the fan 663. When the fan 663 rotates about the rotation shaft 6630, the grill frame 661 may be rotated together with the fan 663.

The grill frame 661 may include side frames 6611 and 6612. The side frames 6611 and 6612 may include a plurality of first side frames 6611 that extend vertically from an edge of the bottom surface 6610, and a second side frame 6612 that connects the plurality of first side frames 6611 and extends to be parallel to the bottom surface 6610.

The grill 662 may be fixed to the side frames 6611 and 6612. The grill 662 may be provided separately from the grill frame 661 and fixed using an adhesive or inserted and integrally injection-molded when the grill frame 661 is injection-molded.

A side fan 6613 that generates an air current that disturbs an air current generated due to the inhalation force of the fan motor may be disposed on upper portions of the side frames 6611 and 6612. For example, an extension part 6614 that forms a part of sides of the grill frame 661 and extends to an upper portion of the second side frame 6612 may be provided, and the side fan 6613 may protrude from an outer side surface of the extension part 6614.

When the grill frame 661 is mounted in the grill case 660, the extension part 6614 having the side fan 6613 formed therein may be accommodated in the grill case 660, and at least a part of the side frames 6611 and 6612 on which the grill 662 is mounted may be exposed to an outside of the grill case 660.

The grill frame 661 and the grill 662 may be rotated together with the fan 663 due to the inhalation force of the fan motor. Dust of the air that whirls in the cyclone chamber 53 and rises may be filtered by the grill 662 and then, the air may flow upward through the air through holes 6620. The air that passes through the air through holes 6620 of the grill 662 may pass through the outlet part 85 and may be filtered once more by the fine filter 84 disposed in the intermediate cover 80.

Dust that does not pass through the air through holes 6620 of the grill 662 and is filtered may be removed from the surface of the grill 662 due to the centrifugal force generated due to rotation of the grill 662. Since dust is not attached on the surface of the grill 662, the user does not need to remove the dust attached on the surface of the grill 662 by his/her hand when removing dust in the cyclone dust collector 40 and thus, this is usage convenient and hygienic.

When the grill frame 661 is rotated in one direction due to the fan 663, an air current may be generated by the side fan 6613 in an opposite direction to a direction of an air current caused by the fan motor. Using the air current generated by the side fan 6613, air may be prevented from flowing toward the outlet part 85 through a gap between an outer side surface of the extension part 6614 and an inner side surface of the grill case 660. Thus, dust in the air in the cyclone chamber 53 may be filtered by the grill 662 and then, the air flows toward the outlet part 85 so that the amount of dust filtered by the fine filter 84 may be reduced and a cleaning or replacement period of the fine filter 84 may be increased. Also, the grill 662 may be prevented from being not rotated by the gap between the gap between the outer side surface of the extension part 6614 and the inner side surface of the grill case 660 clogged by dust.

The grill case 660 may be mounted on the discharge pipe 81. A gasket 665 may be disposed between the grill case 660 and the discharge pipe 81. A description of a structure of the gasket 665 may be similar to the description of a gasket (see 64 of FIG. 8) according to an embodiment of the present invention and thus, a detailed description thereof will be omitted.

Figure 13:
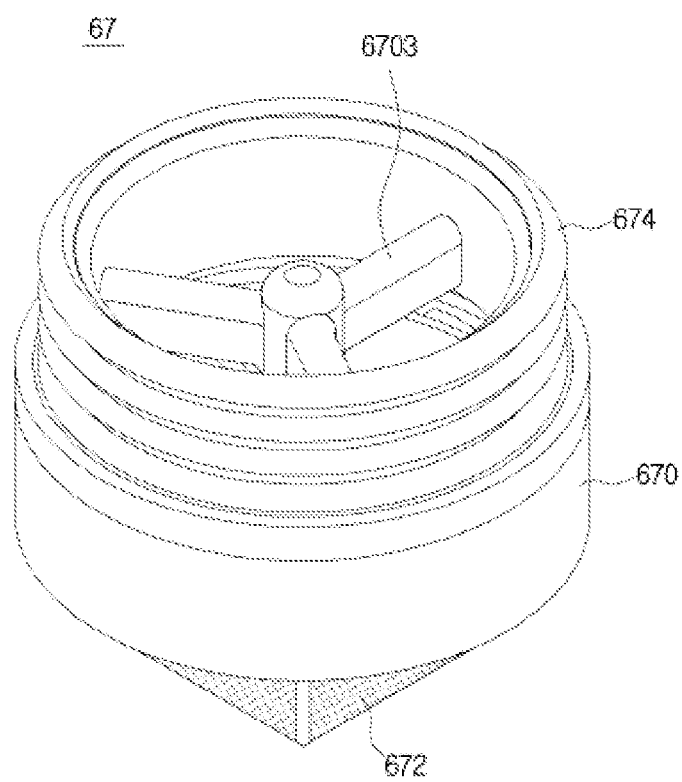
FIG. 13 is a perspective view illustrating a grill assembly according to still another embodiment of the present invention.
Figure 14:
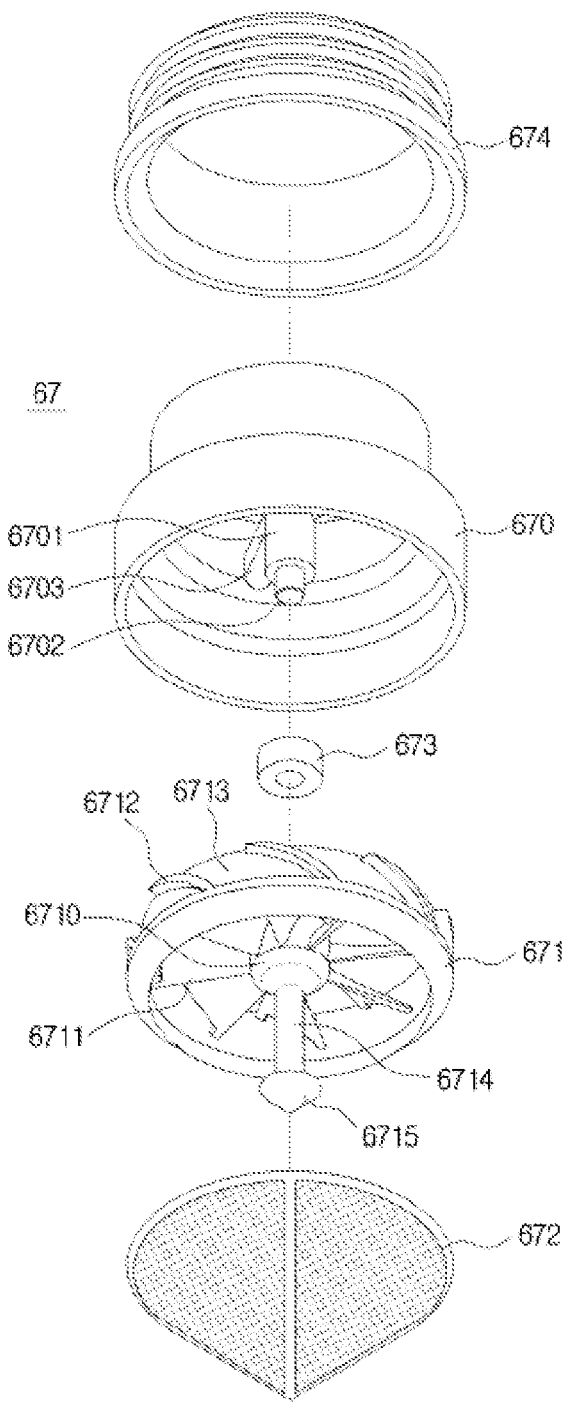
FIG. 14 is an exploded perspective view of a grill assembly according to yet still another embodiment of the present invention.

FIG. 13 is a perspective view illustrating a grill assembly according to still another embodiment of the present invention, and FIG. 14 is an exploded perspective view of a grill assembly according to yet still another embodiment of the present invention.

Referring to FIGS. 13 and 14, a grill 672 of the grill assembly 67 according to still another embodiment of the present invention may be disposed in a conical shape. The grill 672 is provided in the conical shape so that the area of the grill 672 through which air passes may be increased. The area of the grill 672 through which air in the cyclone chamber 53 passes is increased so that an inhalation force caused by the fan motor may be prevented from being lowered.

The grill assembly 67 includes the grill case 670 having a rotation shaft 6701 disposed therein, the rotation shaft 6701 being supported by a plurality of ribs 6703, a fan 671 disposed to be rotatable in one direction due to the inhalation force of the fan motor, and a grill 672 mounted at one side of the fan 671. The grill assembly also includes gasket 674.

The fan 671 may include a first fan 6711 that extends from a center of the fan 671 to a fan case 6713 so that the fan 671 may rotate in one direction due to the inhalation force of the fan motor, and a second fan 6712 that is disposed on an outer side surface of the fan case 6713 and generates an air current that disturbs an air current caused due to the inhalation force of the fan motor. Air may be prevented from being discharged toward the outlet part 85 through a gap between the fan case 6713 and the inner side surface of the grill case 670 by the second fan 6712.

A rotation shaft mounting part 6710 on which the rotation shaft 6701 is mounted may be disposed in a center of the fan 671. A fan mounting part 6702 having a smaller diameter than a diameter of the rotation shaft 6701 may be disposed on an end of the rotation shaft 6701. The fan mounting part 6702 is mounted on one side of the rotation shaft mounting part 6710 so that the fan 671 may be mounted in the grill case 670. A bearing 673 may be disposed between the fan mounting part 6702 and the rotation shaft mounting part 6710 so that the fan 671 may be rotatable due to the inhalation force of the fan motor.

A support shaft 6714 for stably supporting the grill 672 having the conical shape may extend from the other side of the rotation shaft mounting part 6710 of the fan 671. A support protrusion 6715 having a shape corresponding to the inner side surface of the grill 672 may be disposed on an end of the support shaft 6714 to contact the inner side surface of the grill 672 and to support the grill 672. For example, the support protrusion 6715 may be disposed to support the inner side surface of the grill 672 adjacent to vertexes of the grill 672 having the conical shape. The support shaft 6714 and the support protrusion 6715 are disposed to support the grill 672 so that the grill 672 may be stably supported against shaking due to the inhalation force of the fan motor.

A shape of a grill assembly is not limited to the above description. A grill may be disposed to be rotated due to the inhalation force of the fan motor, and a separate driving force may be transferred to the grill so that the grill may be rotated. Although the first fan and the second fan are integrally formed in the above description, the first fan and the second fan may be separately disposed and mounted.

The grill is rotatably disposed so that dust may not be attached on the surface of the grill due to the centrifugal force. Thus, the inhalation force may be prevented from being lowered, and cleaning efficiency may be prevented from being lowered. Also, the user does not need to directly remove dust attached on the surface of the grill by his/her hand and thus, this usage convenient and hygienic.

As described above, according to a cyclone dust collector and a vacuum cleaning device having the same according to an embodiment of the present invention, foreign substance may be prevented from being attached on the outer circumferential surface of the grill located in the outlet part.

In addition, an inhalation force of the vacuum cleaning device can be prevented from being lowered.

Furthermore, since the foreign substances are not attached on the outer circumferential surface of the grill, the foreign substances collected in the cyclone dust collector can be easily removed.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:
1. A cyclone dust collector comprising:
 a cyclone chamber to circulate inhaled air and to separate dust from the air;

an outlet part to discharge the air from which the dust is separated in the cyclone chamber to an outside of the cyclone chamber;

a fan to rotate in the outlet part around a first axis of rotation; and a grill, mounted on the fan and rotatably disposed in the outlet part to rotate with the fan, to rotate around a second axis of rotation and to filter dust from the air introduced through the outlet part, wherein the first axis of rotation is coaxial with the second axis of rotation.

2. The cyclone dust collector of claim 1, wherein the fan is configured to rotate due to an inhalation force of a blower fan driven by a motor of the cyclone dust collector.

3. The cyclone dust collector of claim 2, wherein the fan comprises:

a first fan that extends outward from a center of the fan so that the fan is rotated in a direction by an inhalation force and causes an air current; and a second fan that is disposed at an outside of the first fan and forms an air current in an opposite direction to that of the air current caused by the inhalation force.

4. The cyclone dust collector of claim 3, wherein the fan comprises a fan case, and the first fan is located inside of the fan case, and the second fan is located outside of the fan case.

5. The cyclone dust collector of claim 4, further comprising a grill case mounted on the outlet part, wherein the fan is rotatably accommodated in the grill case.

6. The cyclone dust collector of claim 5, wherein, when the fan rotates due to an inhalation force, an air current that disturbs an air current caused by an inhalation force is generated by the second fan and thus air is prevented from being discharged through a gap between an outer side surface of the fan case and an inner side surface of the grill case.

7. The cyclone dust collector of claim 1, further comprising a fine filter through which air discharged through the outlet part passes.

8. The cyclone dust collector of claim 7, further comprising a cover that covers an upper portion of the cyclone chamber and is capable of being opened/closed.

9. The cyclone dust collector of claim 8, wherein a discharge pipe that is in communication with the outlet part is disposed in a bottom surface of the cover, and the grill is mounted in the discharge pipe.

10. The cyclone dust collector of claim 9, wherein the grill is mounted in the discharge pipe through a grill case.

11. The cyclone dust collector of claim 10, wherein a gasket including an elastic material is disposed between the grill case and the discharge pipe.

12. The cyclone dust collector of claim 1, further comprising a dust collection chamber that is in communication with the cyclone chamber so that dust separated in the cyclone chamber is collected.

13. A cyclone dust collector comprising:

a cyclone chamber to circulate inhaled air and to separate dust from the air;

an outlet part to discharge the air from which the dust is separated to an outside of the cyclone chamber;

a fan, included in the outlet part, to rotate around a first axis of rotation; and a grill, mounted on the fan in the outlet part, to rotate integrally with the fan and around a second axis of rotation, wherein the first axis of rotation is coaxial with the second axis of rotation.

14. The cyclone dust collector of claim 13, wherein the fan is disposed to rotate due to an inhalation force of a blower fan driven by a motor of the cyclone dust collector that allows the air to be introduced into the cyclone chamber.

15. The cyclone dust collector of claim 13, further comprising a grill case in which the fan is accommodated, wherein the grill case is mounted in the outlet part.

16. The cyclone dust collector of claim 13, wherein a side fan is disposed on an outer side surface of the fan to generate an air current that disturbs an air current caused by an inhalation force introduced into the cyclone chamber.

17. The cyclone dust collector of claim 13, further comprising a grill frame on which the grill is mounted, wherein the grill frame is connected to the fan and is rotatable integrally with the fan.

18. The cyclone dust collector of claim 17, further comprising a grill case on which the grill frame is mounted, wherein the grill case is mounted in the outlet part.

19. The cyclone dust collector of claim 18, wherein a side fan for generating an air current that disturbs an air current caused by an inhalation force introduced into the cyclone chamber is disposed on an outer side surface of the grill frame.

20. The cyclone dust collector of claim 13, wherein a cover that is capable of being opened/closed is further disposed at an upper portion of the cyclone chamber, and wherein a fine filter through which the air discharged through the outlet part passes is disposed in the cover.

* * * * *